US008867438B2

(12) United States Patent
Kim et al.

(10) Patent No.: US 8,867,438 B2
(45) Date of Patent: Oct. 21, 2014

(54) DATA TRANSMISSION APPARATUS AND METHOD FOR A HIGH-SPEED PACKET ACCESS SYSTEM

(75) Inventors: Oh Seok Kim, Seoul (KR); Byung Duck Cho, Seoul (KR); Young Ky Kim, Seoul (KR); Yong Duk Cho, Yongin-si (KR); Jae Hawk Lee, Suwon-si (KR); Young Yong Lee, Suwon-si (KR); Jong Han Kim, Yongin-si (KR); Seung Wan Chae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 852 days.

(21) Appl. No.: 13/002,239

(22) PCT Filed: Jun. 30, 2009

(86) PCT No.: PCT/KR2009/003553
§ 371 (c)(1),
(2), (4) Date: May 3, 2011

(87) PCT Pub. No.: WO2010/002178
PCT Pub. Date: Jan. 7, 2010

(65) Prior Publication Data
US 2011/0205985 A1 Aug. 25, 2011

(30) Foreign Application Priority Data

Jul. 1, 2008 (KR) ........................ 10-2008-0063434

(51) Int. Cl.
*H04W 4/00* (2009.01)
*H04L 12/801* (2013.01)
*H04W 52/28* (2009.01)
*H04L 12/835* (2013.01)
*H04W 28/14* (2009.01)

(52) U.S. Cl.
CPC ............... *H04L 47/10* (2013.01); *H04W 28/14* (2013.01); *H04W 52/286* (2013.01); *H04L 47/14* (2013.01); *H04L 47/30* (2013.01)
USPC ......................................................... 370/328

(58) Field of Classification Search
None
See application file for complete search history.

(56) References Cited

U.S. PATENT DOCUMENTS

2003/0108013 A1* 6/2003 Hwang et al. ................. 370/335
2006/0128410 A1* 6/2006 Derryberry et al. .......... 455/509

(Continued)

FOREIGN PATENT DOCUMENTS

KR 10-2005-0122143 A 12/2005
KR 10-2007-0043880 A 4/2007

*Primary Examiner* — Bob Phunkulh
(74) *Attorney, Agent, or Firm* — Jefferson IP Law, LLP

(57) ABSTRACT

A data transmission method for a high-speed packet access system includes: sending, by a user equipment, packet data containing scheduling information having size information of a packet buffer through an uplink channel to a base station, and sending quality indicator information and acknowledgement information through another uplink channel to the base station; determining, by the base station, the value of a turbo mode flag by comparing amounts of data stored in the packet buffer of the user equipment and a packet buffer of the base station respectively with preset thresholds; and deactivating, by the user equipment when the turbo mode flag of an order message contained in received control data, packet data reception and control data transmission, and redirecting transmit power of a specified transmitter to a packet data transmitter to increase transmit power of the packet data transmitter for faster packet data upload.

13 Claims, 10 Drawing Sheets

(56) References Cited

U.S. PATENT DOCUMENTS

2006/0268789 A1* 11/2006 Yu et al. .................. 370/335
2008/0304430 A1* 12/2008 Zhuyan .................... 370/278
2010/0093386 A1* 4/2010 Damnjanovic et al. ...... 455/522

* cited by examiner ial data channel (DPDCH) to transmit high-speed packet data. In the HSPA mobile communication system, uplink channels for high-speed packet transmission from a user equipment to a base station include a high speed dedicated physical control channel (HS-DPCCH), dedicated physical control channel (DPCCH) and dedicated physical data channel (DPDCH), and further include an enhanced dedicated physical control channel (E-DPCCH) and enhanced dedicated physical data channel (E-DPDCH).

DATA TRANSMISSION APPARATUS AND METHOD FOR A HIGH-SPEED PACKET ACCESS SYSTEM

TECHNICAL FIELD

The present invention relates to a data transmission apparatus and method for a high-speed packet access system and, more particularly, to an apparatus and method that can heighten data transmission rates of uplink channels.

BACKGROUND ART

In general, channels of a mobile communication system include downlink channels for transmitting data from a base station to user equipments and uplink channels for transmitting data from user equipments (UE) to a base station (Node-B). A mobile communication system based on high-speed packet access (HSPA) technology enabling high-speed packet data services includes a dedicated physical data channel (DPDCH) and a dedicated physical control channel (DPCCH) to transmit high-speed packet data. In the HSPA mobile communication system, uplink channels for high-speed packet transmission from a user equipment to a base station include a high speed dedicated physical control channel (HS-DPCCH), dedicated physical control channel (DPCCH) and dedicated physical data channel (DPDCH), and further include an enhanced dedicated physical control channel (E-DPCCH) and enhanced dedicated physical data channel (E-DPDCH).

The data rate for packet data over E-DPDCH (an uplink high-speed packet data channel) is determined in consideration of the remaining power in the user equipment. FIG. 1 illustrates uplink physical channels and the total power available to a user equipment, and FIG. 2 depicts the relationship between the remaining power of the user equipment and the packet data rate. FIG. 2 indicates that the uplink packet data rate of a user equipment is proportional to the amount of power allocated to an uplink packet data channel E-DPDCH. However, as indicated by FIG. 1, power allocatable to the uplink packet data channel E-DPDCH is limited to the remaining power after power is allocated to all uplink physical channels other than E-DPDCH.

As described above, only the remaining power after power allocation to all uplink physical channels other than E-DPDCH is available to E-DPDCH. However, when a high data rate is required for data upload (as in the case of high order modulation), it is preferable to allocate as much transmit power to E-DPDCH as possible.

DISCLOSURE

Technical Problem

The present invention has been made in view of the above problems, and the present invention provides an apparatus and method that enable a mobile communication system to increase the uplink data rate for high-speed data upload by deactivating a particular uplink channel and redirecting the power having been allocated to the deactivated uplink channel to an uplink high-speed data channel. For example, a user equipment sends channel quality indicator (CQI) information over HS-DPCCH, and creates, when high-speed downlink shared channel (HS-DSCH) data is received, ACK/NACK information and sends the same over HS-DPCCH. In this case, while no data is downloaded from a base station to the user equipment, HS-DPCCH operation may be temporarily suspended without much impact. In other words, when a high uplink data rate is required by the user equipment and only a low downlink data rate is required by the base station, the user equipment can increase the uplink data rate by redirecting the power having been allocated to HS-DPCCH to E-DPDCH.

Technical Solution

In accordance with an exemplary embodiment of the present invention, there is provided a terminal apparatus in a high-speed packet access system, including: a dedicated control channel transmitter sending quality indicator information and acknowledgement information of a user equipment; a packet data channel transmitter sending packet data of the user equipment; and a terminal control unit redirecting, in turbo mode for high-speed transmission, power allocated to the dedicated control channel transmitter to the transmit power of the packet data channel transmitter to provide additional power to the packet data channel transmitter.

In accordance with another exemplary embodiment of the present invention, there is provided a data transmission apparatus for a base station equipment in a high-speed packet access system, including: a packet data channel receiver receiving scheduling information having size information of a packet buffer in a user equipment and upload packet data; a dedicated control channel receiver receiving quality indicator information and acknowledgement information from the user equipment; a packet data transmitter sending packet data to be downloaded to the user equipment; a control data transmitter sending control data to be downloaded to the user equipment wherein the control data includes a control order message having a turbo mode flag; and a control unit comparing amounts of data stored in the packet buffer of the user equipment and a packet buffer of the base station respectively with preset thresholds to determine the value of the turbo mode flag, and deactivating, when the turbo mode flag is set, the packet data transmitter and dedicated control channel receiver.

In accordance with another exemplary embodiment of the present invention, there is provided a high-speed packet access system including a user equipment and a base station, wherein the user equipment includes: an uplink packet data transmitter sending scheduling information containing size information of a packet buffer and sending upload packet data; an uplink dedicated control channel transmitter sending quality indicator information and acknowledgement information of the user equipment; a packet data receiver receiving packet data downloaded from the base station; a control data receiver receiving control data downloaded from the base station wherein the control data includes an order message having a turbo mode flag; and a UE control unit deactivating, when the turbo mode flag is set, the packet data receiver and the uplink dedicated control channel transmitter, and redirecting transmit power of the uplink dedicated control channel transmitter to the uplink packet data transmitter to increase transmit power of the uplink packet data transmitter for faster packet data upload, and wherein the base station includes: a packet data receiver receiving scheduling information having size information of a packet buffer in the user equipment and receiving upload packet data; a dedicated control channel receiver receiving quality indicator information and acknowledgement information from the user equipment; a downlink packet data transmitter sending packet data to be downloaded to the user equipment; a downlink control data transmitter sending control data to be downloaded to the user equipment wherein the control data includes a control order message having a turbo mode flag; and a BS control unit comparing data sizes of the packet buffer of the user equipment and a packet buffer of the base station respectively with preset thresholds to determine the value of the turbo mode flag, and deactivating, when the turbo mode flag is set, the downlink packet data transmitter and dedicated control channel receiver.

In accordance with another exemplary embodiment of the present invention, there is provided a data transmission method for a user equipment in a high-speed packet access system, including: sending packet data containing scheduling information having size information of a packet buffer through an uplink channel, and sending quality indicator information and acknowledgement information of the user equipment through another uplink channel; checking a turbo mode flag of an order message contained in control data received from the base station; and deactivating, when the turbo mode flag is set, packet data reception and control data transmission, and redirecting transmit power of a specified transmitter to a packet data transmitter to increase transmit power of the packet data transmitter for faster packet data upload.

In accordance with another exemplary embodiment of the present invention, there is provided a data transmission method for a base station equipment in a high-speed packet access system, including: receiving scheduling information containing size information of a packet buffer in a user equipment and upload packet data; determining the value of the turbo mode flag by comparing amounts of data stored in the packet buffer of the user equipment and a packet buffer of a base station respectively with preset thresholds; and deactivating, when the turbo mode flag is set, operation of a packet data transmitter and a dedicated control channel receiver, and processing packet data uploaded at high speed from the user equipment.

In accordance with another exemplary embodiment of the present invention, there is provided a data transmission method for a high-speed packet access system, including: sending, by a user equipment, packet data containing scheduling information having size information of a packet buffer through an uplink channel to a base station, and sending quality indicator information and acknowledgement information of the user equipment through another uplink channel to the base station; determining, by the base station, the value of a turbo mode flag by comparing amounts of data stored in the packet buffer of the user equipment and a packet buffer of the base station respectively with preset thresholds; and deactivating, by the user equipment when the turbo mode flag of an order message contained in control data received from the base station, packet data reception and control data transmission, and redirecting transmit power of a specified transmitter to a packet data transmitter to increase transmit power of the packet data transmitter for faster packet data upload.

Advantageous Effects

In a feature of the present invention, turbo mode operation is performed between a base station and a user equipment to thereby improve upload functionality of the user equipment. First, the user equipment in turbo mode may redirect power allocated to a data transmitter to E-DPDCH. When the user equipment utilizes the 16-QAM modulation scheme requiring high E-DPDCH transmit power, it may improve upload functionality by employing the method of the present invention. Second, the mobile terminal does not receive HS-DSCH data through HS-PDSCH after entering uplink turbo mode. Hence, the mobile terminal may reduce processing time required for HS-DSCH data. That is, as operation related to a downlink path of the user plane is not necessary, the mobile terminal may allocate more processing time to an uplink path. Third, when the user equipment enters uplink turbo mode, the base station does not have to allocate HS-PDSCH to the user equipment and may redirect the same to another user equipment. Hence, the base station may efficiently use channelization codes allocatable to HS-PDSCH. Fourth, the user equipment has to manage and identify necessity of transmission of ACK/NACK information and CQI information in order to calculate the remaining power allocatable to E-DPDCH. After entering uplink turbo mode, the user equipment does not perform creation and transmission of ACK/NACK and CQI information, thereby simplifying control operation and transmit power calculation performed by the user equipment.

DESCRIPTION OF DRAWINGS

The objects, features and advantages of the present invention will be more apparent from the following detailed description in conjunction with the accompanying drawings, in which.

BEST MODE

Figure 1:
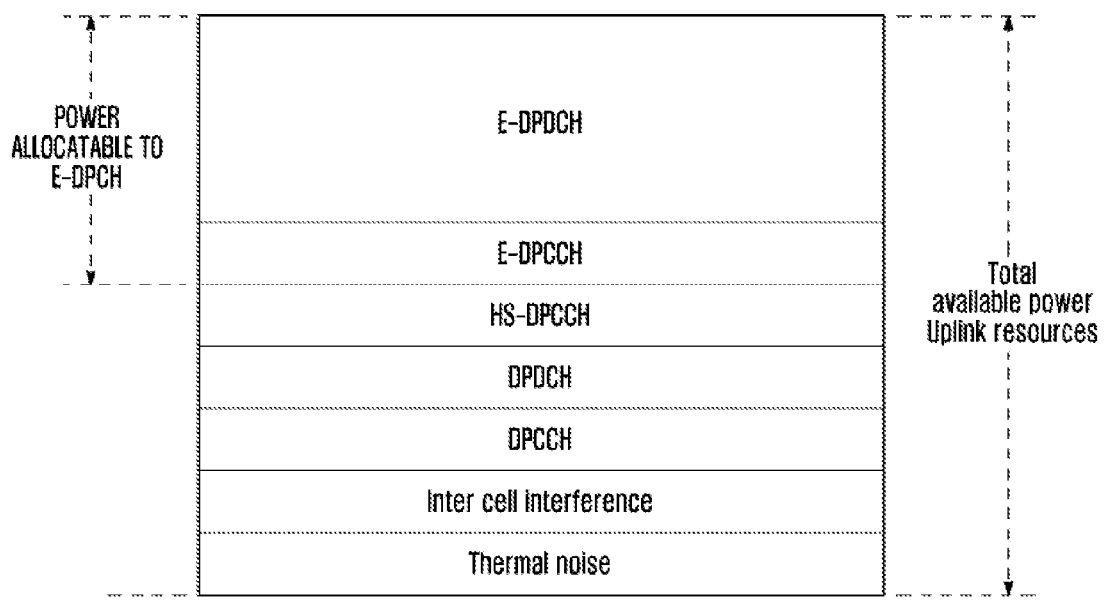
FIG. 1 illustrates physical channels related to the uplink and the total power available to a user equipment.
Figure 2:
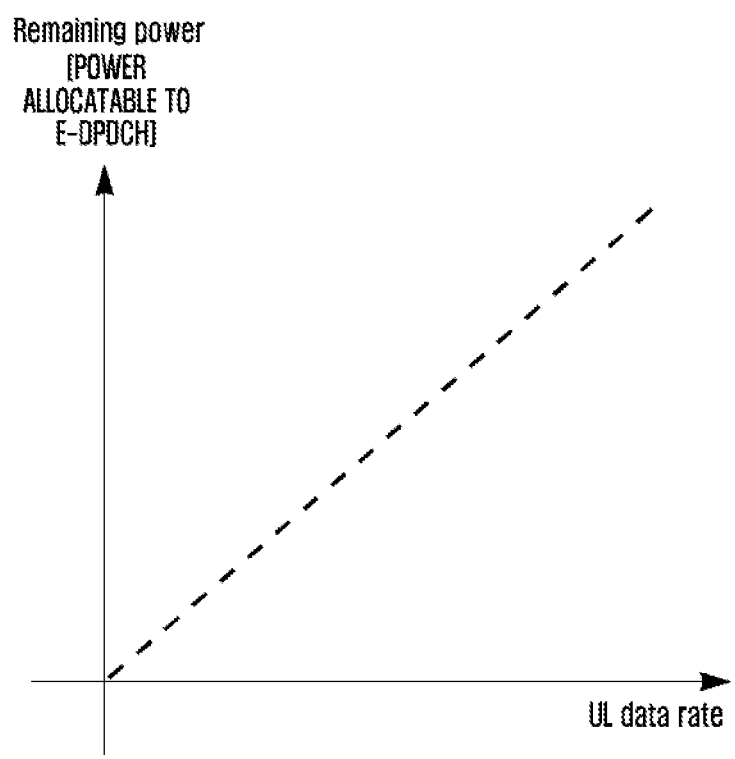
FIG. 2 depicts the relationship between the remaining power of the user equipment and the packet data rate.

Hereinafter, exemplary embodiments of the present invention are described in detail with reference to the accompanying drawings. The same reference symbols identify the same or corresponding elements in the drawings.

In the description, "packet data transmission channel" for a user equipment (packet data reception channel for a base station) refers to the enhanced dedicated physical channel (E-DPCH) in the uplink and particularly to the enhanced dedicated physical data channel (E-DPDCH). "Dedicated control transmission channel" for a user equipment (dedicated control reception channel for a base station) may refer to the high-speed dedicated physical control channel (HS-DPCCH), "packet data transport channel" for a base station (packet data reception channel for a user equipment) may refer to the high-speed downlink shared channel (HS-DSCH), and "control data transport channel" for a base station (control data reception channel for a user equipment) may refer to the high-speed shared control channel (HS-SCCH).

Embodiments of the present invention relate to an apparatus and method that can increase the uplink data rate for data upload when a user equipment uses a particular service that requires a high uplink data rate and a relatively low downlink data rate.

Figure 3:
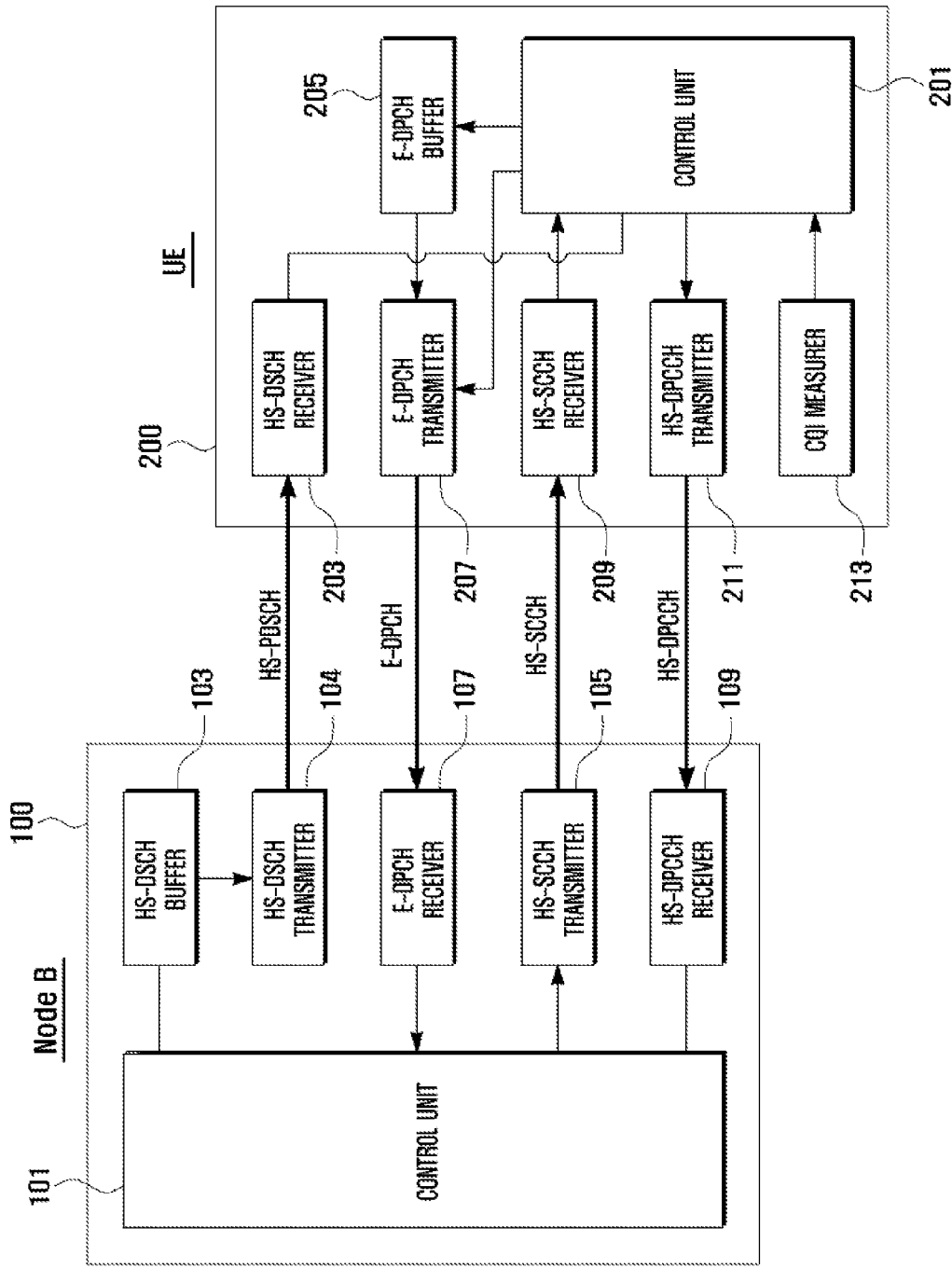
FIG. 3 illustrates interactions between a base station and a user equipment in a mobile communication system according to an embodiment of the present invention.
Figure 4:
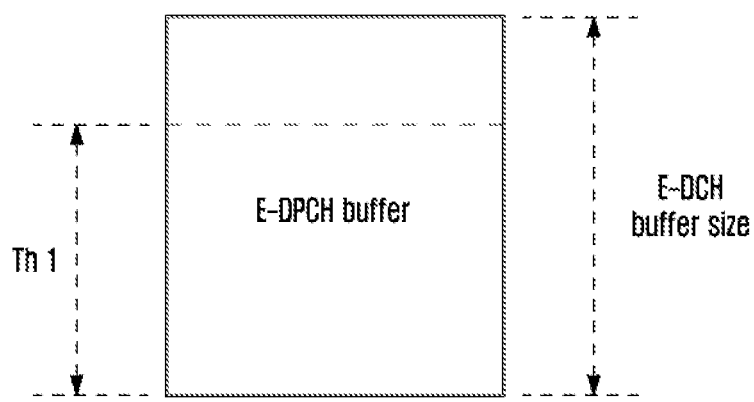
FIG. 4 illustrates setting of a threshold value of an E-DCH buffer storing data that is to be uploaded by the user equipment to the base station through E-DPDCH.
Figure 5:
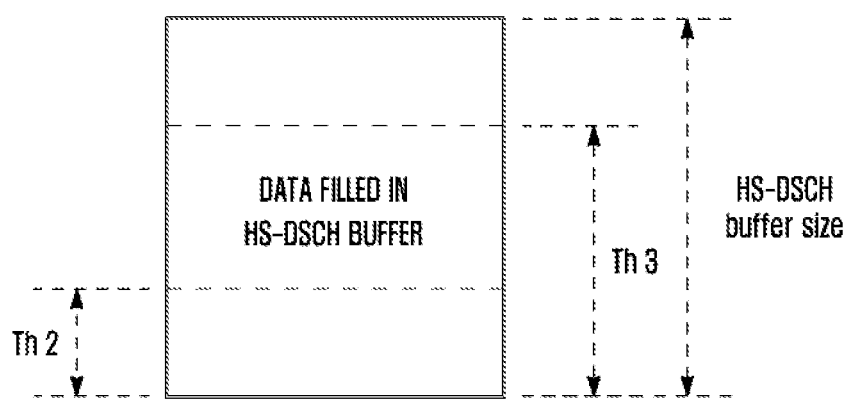
FIG. 5 illustrates setting of threshold values of an HS-DSCH buffer storing data that is to be downloaded by the base station to the user equipment through HS-PDSCH.
Figure 6:
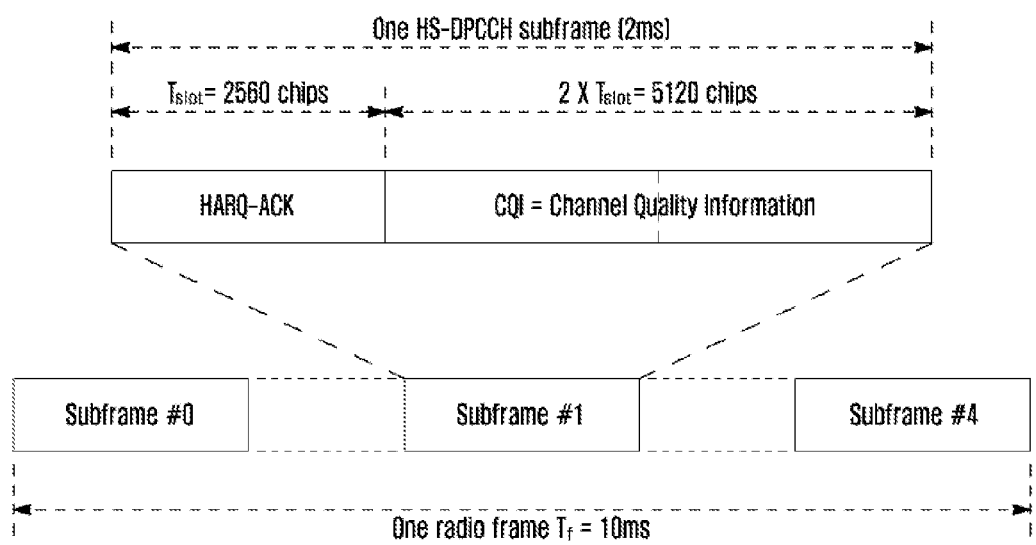
FIG. 6 illustrates an uplink HS-DPCCH frame structure.
Figure 7:
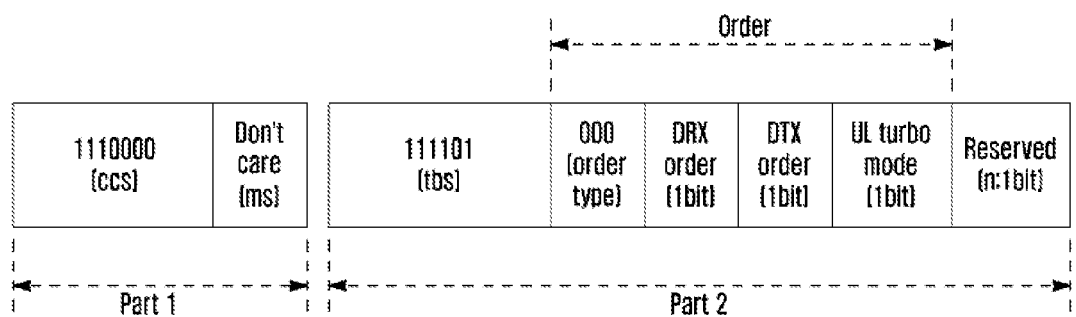
FIG. 7 illustrates the format of a downlink HS-SCCH order message.
Figure 8:
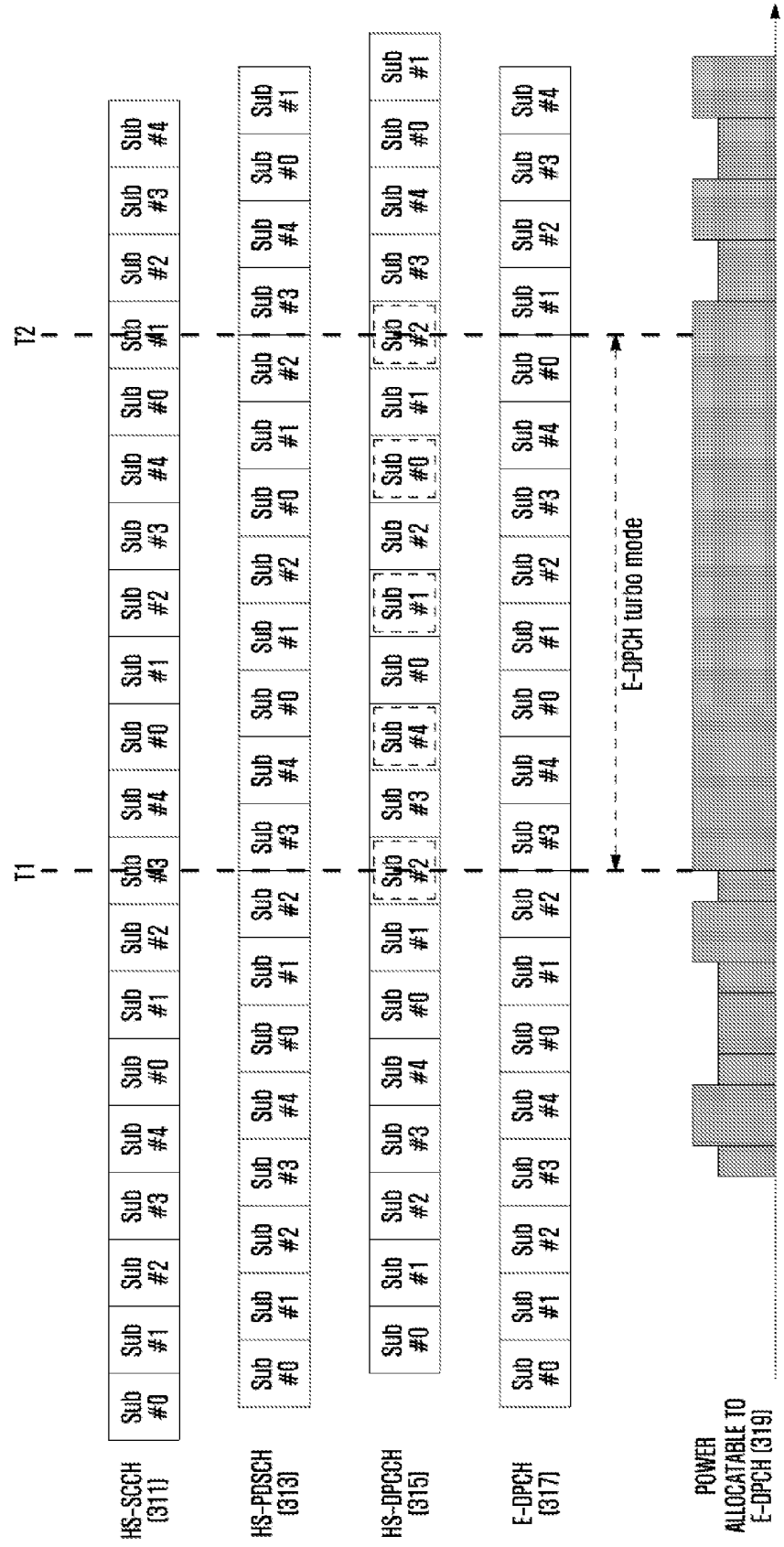
FIG. 8 depicts transmission of HS-DPCCH and E-DPDCH data according to an embodiment of the present invention.

FIG. 3 illustrates interactions between a base station and a user equipment in a mobile communication system according to an embodiment of the present invention. FIG. 4 illustrates setting of a threshold value of an E-DCH buffer storing data that is to be uploaded by the user equipment to the base station through E-DPDCH, and FIG. 5 illustrates setting of threshold values of an HS-DSCH buffer storing data that is to be downloaded by the base station to the user equipment through HS-PDSCH. FIG. 6 illustrates an uplink HS-DPCCH frame structure, and FIG. 7 illustrates the format of a downlink HS-SCCH order message. FIG. 8 depicts transmission of HS-DPCCH and E-DPDCH data according to an embodiment of the present invention.

A description is given of uplink data transmission by the user equipment (UE) in connection with FIGS. 3 to 8.

Firstly in the base station (Node B), an HS-DSCH buffer 103 stores data that is to be sent to the user equipment through the high-speed physical downlink shared channel (HS-PDSCH). Data stored in the HS-DSCH buffer 103 is accessed and sent to the user equipment through HS-PDSCH under the control of a control unit 101. HS-DSCH is a downlink transport channel for high-speed packet data transmission. For high-speed packet data transmission, one high-speed dedicated physical control channel (HS-DPCCH), one HS-DSCH, and at least one high-speed shared control channel (HS-SCCH) are established between the base station and the user equipment. Here, HS-PDSCH is a physical channel to which HS-DSCH is mapped, and at least one HS-SCCH is associated with HS-DSCH. An HS-SCCH transmitter 105 generates control information related to the transport format and resource indicator (TFRI) (indicating channelization codes, modulation scheme and transport block (TB) set size) and the hybrid automatic repeat request (HARQ), and sends the control information to the user equipment through HS-SCCH under the control of the control unit 101. Here, HS-SCCH is a downlink control channel and one user equipment may utilize up to four HS-SCCHs. In an embodiment of the present invention, HS-SCCH information may have a format shown in FIG. 7. The HS-SCCH order format shown in FIG. 7 further includes a turbo mode flag indicating whether to permit the user equipment to perform turbo mode operation. The user equipment may upload packet data at high speed in turbo mode.

An E-DPCH receiver 107 receives and processes data from the user equipment through the uplink data channel E-DPCH. Here, the enhanced dedicated physical channel (E-DPCH) is a channel used by the user equipment to upload packet data at high speed, and may correspond to an enhanced dedicated physical data channel (E-DPDCH) and enhanced dedicated physical control channel (E-EPCCH). Data transmitted through E-DPCH may include scheduling information and upload data (for example, packet data) of the user equipment. The scheduling information may include status information (upload data size) of an E-DPCH buffer 205 storing data to be uploaded by the user equipment. The E-DPCH receiver 107 extracts scheduling information from data sent by the user equipment and forwards the extracted scheduling information to the control unit 101.

An HS-DPCCH receiver 109 receives HARQ-ACK and CQI from the user equipment through HS-DPCCH and analyzes them. HARQ-ACK refers to demodulation results obtained by HARQ operation and may be ACK or NACK information. CQI refers to quality of the radio channel measured by the user equipment at the current location.

The control unit 101 of the base station identifies scheduling information in E-DPCH data received by the E-DPCH receiver 107 and analyzes the E-DPCH buffer status contained in the scheduling information. The control unit 101 examines the status of the HS-DSCH buffer 103. When the amount of data in the E-DPCH buffer 205 exceeds a preset threshold value and the amount of data in the HS-DSCH buffer 103 is less than the threshold value (that is, the amount of upload data is large and the amount of download data is small), the control unit 101 controls the HS-SCCH transmitter 105 to set the turbo mode flag of an HS-SCCH order message shown in FIG. 7 and enters uplink turbo mode. In uplink turbo mode, the control unit 101 deactivates HS-PDSCH transmission and HS-DPCCH reception (that is, suspends operation of the HS-DSCH transmitter 104), and receives high-speed upload data through the E-DPCH receiver 107 from the user equipment and processes the received data.

During uplink turbo mode, the control unit 101 examines the status of the HS-DSCH buffer 103. When the amount of data in the HS-DSCH buffer 103 is greater than or equal to a preset threshold value, the control unit 101 resets the turbo mode flag of an HS-SCCH order message to transition from uplink turbo mode to normal mode. In normal mode, the control unit 101 activates HS-PDSCH transmission and HS-DPCCH reception (that is, activates the HS-DSCH transmitter 104 and the HS-DPCCH receiver 109).

Secondly in the user equipment, an HS-DSCH receiver 203 receives download data through HS-PDSCH. An HS-SCCH receiver 209 receives an HS-SCCH order message through HS-SCCH and, in particular, extracts the turbo mode flag from the HS-SCCH order message as shown in FIG. 7 and forwards the turbo mode flag to a control unit 201 of the user equipment.

A CQI measurer 213 measures quality of the radio channel at the current location and forwards the measurement result to the control unit 201. An HS-DPCCH transmitter 211 sends an HS-DPCCH frame generated by the control unit 201 through HD-DPCCH. As described before, the HS-DPCCH frame includes HARQ-ACK and CQI information. The user equipment measures CQI and reports the same to the base station at regular intervals, and the base station utilizes CQI reports as basic information for a scheduler managing the modulation scheme and code sets. CQI is reported once for each preset duration (CQI feedback cycle) specified by the base station, HARQ-ACK is sent after 7.5 slots from reception of corresponding data. FIG. 6 illustrates an HS-DPCCH frame. The user equipment sends one HS-DPCCH frame to the base station every 2 ms. Referring to FIG. 6, the user equipment should report CQI to the base station once per two subframes, and send ACK/NACK information to the base station at 7.5 slots after HS-DSCH reception.

The E-DPCH buffer 205 stores data to be uploaded to the base station. An E-DPCH transmitter 207 sends scheduling information (SI) and data to the base station. Here, the scheduling information includes status information of the E-DPCH buffer 205 (such as the amount of data stored in the E-DPCH buffer 205).

The control unit 201 of the user equipment demodulates an HS-SCCH signal, and detects an HS-SCCH order message from the demodulated HS-SCCH signal. As illustrated in FIG. 3, an HS-SCCH order message is composed of a first part (part 1) and a second part (part-2), and the turbo mode flag is present in the second part. When the turbo mode flag is set (i.e. turbo mode), the control unit 201 controls an HS-DPCCH transmitter 211 to block transmission of HS-DPCCH messages and controls the HS-DSCH receiver 203 to block HS-DSCH reception through HS-DPSCH. That is, in turbo mode, the control unit 201 deactivates HS-DSCH reception and HS-DPCCH transmission. Thereafter, the control unit 201 performs power redistribution by determining the power allocated to the deactivated transmission channel like HS-DPCCH and redirecting the determined power to an E-DPCH transmitter 207 sending E-DPCH data. That is, HS-DPCCH transmit power is added to existing E-DPCH transmit power, thereby increasing the E-DPCH data rate. Here, E-DPCH may correspond to E-DPDCH. During turbo mode, the control unit 201 analyzes an HS-SCCH order message received by the HS-SCCH receiver 209 to check the turbo mode flag. When the turbo mode flag is reset (i.e. transition to normal mode), the control unit 201 performs power redistribution to activate HS-PDCCH transmission and HS-DSCH reception. At this time, frame data as illustrated in FIG. 6 is created by the HS-DPCCH transmitter 211 and sent through HS-DPCCH, and data received through HS-PDSCH from the base station is processed. In normal mode, E-DPCH transmit power is limited to the remaining power after power allocation to other transmission channels.

Referring to FIG. 8, before time T1, the user equipment performs normal mode operation and transmits HD-DPCCH frame data (as in FIG. 6) and E-DPCH frame data respectively through HS-DPCCH and E-DPCH as indicated by reference symbols 315 and 317. As shown in FIG. 6, HS-DPCCH frame data is composed of an HARQ-ACK part carrying ACK/NACK information and a CQI part carrying channel quality information. When the CQI feedback cycle is 2, HS-DPCCH frame data is sent at least once every 2 subframes after a preset time (in this case, 7.5 slots) from reception of HS-DSCH data. Hence, in normal mode, reference symbol 319 prior to time T1 indicates the power allocated to E-DPCH by the control unit 201.

During normal mode operation, when the amount of data to be uploaded by the user equipment is large and the amount of data to be downloaded by the base station is relatively small, the user equipment may perform turbo mode operation to increase upload efficiency under the control of the base station. To achieve this, the control unit 101 of the base station examines status information of the E-DPCH buffer 205 in scheduling information reported by the user equipment and checks the status of the HS-DSCH buffer 103. When the amount of data stored in the E-DPCH buffer 205 is greater than or equal to a first threshold Th1 as shown in FIG. 4 and the amount of data stored in the HS-DSCH buffer 103 is less than or equal to a second threshold Th2 as shown in FIG. 5, the control unit 101 of the base station creates an HS-SCCH order message whose turbo mode flag is set and sends the same through the HS-SCCH transmitter 105 to the user equipment, notifying the user equipment of turbo mode.

When the turbo mode flag is set in the HS-SCCH order message, the user equipment deactivates the HS-DSCH receiver 203 and the HS-DPCCH transmitter 211 to block HS-PDSCH reception and HS-DPCCH transmission as indicated by reference symbols 313 and 315, and adjusts the E-DPCH transmit power by redirecting power allocated to the HS-DPCCH transmitter 211 to the E-DPCH transmitter 207.

The remaining power that is additionally allocatable to E-DPCH is determined using Equation 1.

remaining power available to $E\text{-}DPCH = (PMAX - PDPCCH - PDPDCH - PE\text{-}DPCH)/PDPCCH$ <Equation 1>

Later, the power calculated using Equation 1 is added to the E-DPCH transmit power. After time T1 in FIG. 8 (i.e., in turbo mode), the control unit 201 of the user equipment adds the power calculated using Equation 1 (related to the deactivated channel due to turbo mode, like HS-DPCCH) to the existing E-DPCH transmit power. Here, E-DPCH may correspond to E-DPDCH sending upload data of the user equipment. Consequently, as indicated by an interval from time T1 to time T2 in FIG. 8, the transmit power allocated to E-DPCH (reference symbol 319) is increased, thereby increasing the upload speed of data stored in the E-DPCH buffer 205.

During turbo mode operation (interval from time T1 to time T2 in FIG. 8), the user equipment analyzes an HS-SCCH order message received through HS-SCCH. That is, in turbo mode with an increased upload data rate, the user equipment must be able to transition from turbo mode to normal mode under the control of the base station. The transition from turbo mode to normal mode may be initiated when data upload is finished in the user equipment (or a request for data upload termination is generated in the user equipment) or when the amount of data to be downloaded from the base station to the user equipment exceeds a preset vale (i.e., when the amount of data buffered in the HS-DSCH buffer 103 exceeds a third threshold Th3). Next, a description is given of the transition from turbo mode to normal mode. In turbo mode, the control unit 101 of the base station deactivates HS-DSCH data transmission and HS-DPCCH data reception. The control unit 101 checks the amount of data stored in the HS-DSCH buffer 103. When the amount of data stored in the HS-DSCH buffer 103 is greater than or equal to the third threshold Th3 as shown in FIG. 5, the control unit 101 transitions from turbo mode to normal mode to download the stored data to the user equipment. Thereto, the control unit 101 resets the turbo mode flag of an HS-SCCH order message and sends the HS-SCCH order message to the user equipment through the HS-SCCH transmitter 105.

When the turbo mode flag of the received HS-SCCH order message is reset, the control unit 201 of the user equipment transitions to normal mode. The user equipment adjusts the E-DPCH transmit power to activate the HS-DPCCH transmitter 211 and the HS-DSCH receiver 203, reactivating HS-DPCCH transmission and HS-DSCH reception that were deactivated in turbo mode. Thereafter, the user equipment sends an HD-DPCCH message containing HS-DPCCH ACK/NACK and CQI feedback information.

Figure 9:
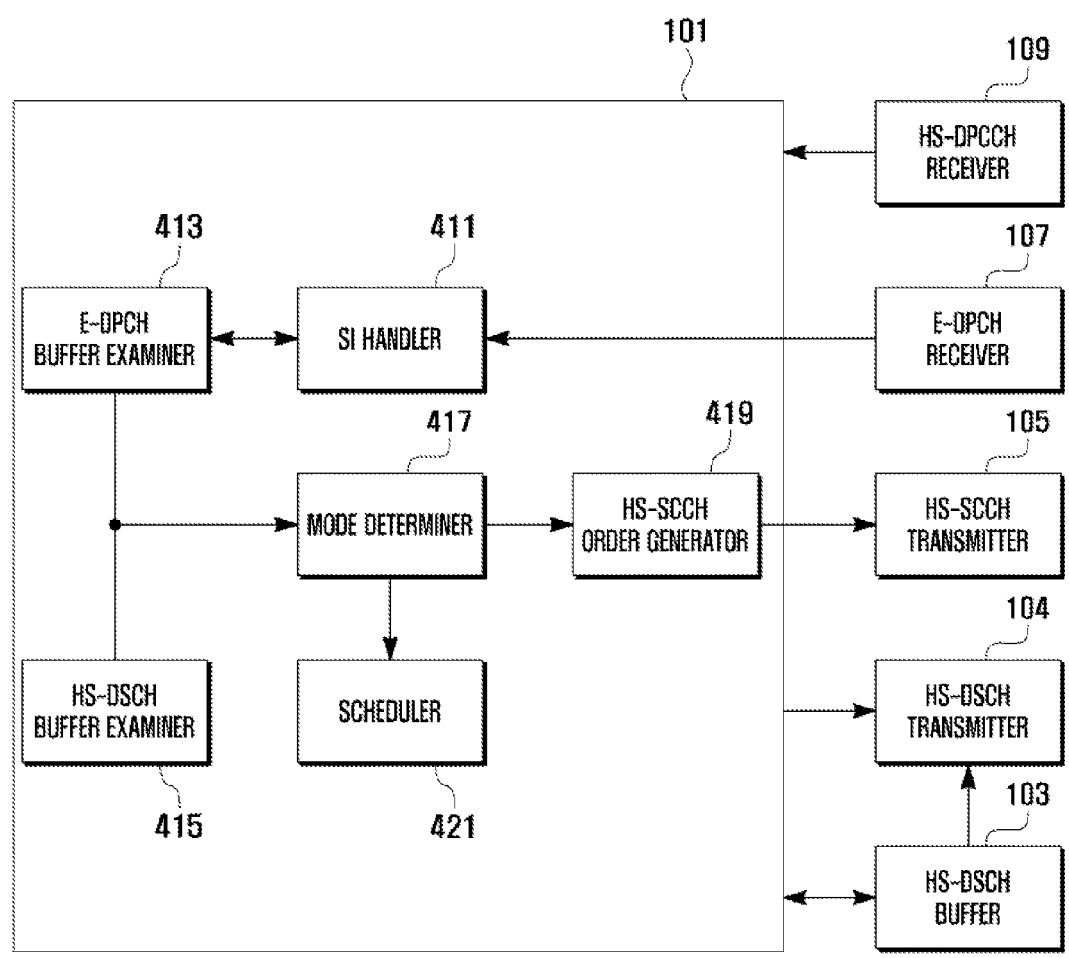
FIG. 9 is a block diagram illustrating a base station equipment controlling turbo mode operation of a user equipment according to an embodiment of the present invention.

FIG. 9 is a block diagram of a base station equipment controlling turbo mode operation of a user equipment according to an embodiment of the present invention.

Referring to FIG. 9, the E-DPCH receiver 107 is composed of an E-DPCCH receiver and an E-DPDCH receiver. In particular, E-DPDCH data includes scheduling information (SI) of the user equipment, and the scheduling information includes status information (size of buffered data) of the E-DPCH buffer 205. An SI handler 411 extracts scheduling information from received E-DPCH data to examine the status of the user equipment. An E-DPCH buffer examiner 413 checks status information of the E-DPCH buffer using the scheduling information extracted by the SI handler 411 to identify the amount of data to be uploaded. In particular, the E-DPCH buffer examiner 413 compares the amount of data stored in the E-DPCH buffer 205 with the first threshold Th1 as shown in FIG. 4. When the amount of data to be uploaded by the user equipment is greater than or equal to the first threshold Th1, the E-DPCH buffer examiner 413 generates a first control signal for initiating turbo mode.

An HS-DSCH buffer examiner 415 identifies the amount of data stored in the HS-DSCH buffer 103. Here, the data stored in the HS-DSCH buffer 103 is data that is to be downloaded to the user equipment through the HS-DSCH transmitter 104. The HS-DSCH buffer examiner 415 compares the amount of data stored in the HS-DSCH buffer 103 with threshold values and produces comparison results. Here, the threshold values include the second threshold Th2 and the third threshold Th3. The second threshold Th2 is used by the base station to initiate turbo mode of the user equipment, and the third threshold Th3 is used in turbo mode to terminate turbo mode and initiate normal mode. The HS-DSCH buffer examiner 415 generates a second control signal to initiate turbo mode of the user equipment when the amount of data stored in the HS-DSCH buffer 103 is less than the second threshold Th2, and generates a third control signal to terminate turbo mode of the user equipment and initiate normal mode when the amount of data stored in the HS-DSCH buffer 103 exceeds the third threshold Th3.

A mode determiner 417 determines an operation mode of the user equipment by analyzing outputs of the E-DPCH buffer examiner 413 and the HS-DSCH buffer examiner 415. When the amount of data stored in the E-DPCH buffer 205 exceeds the first threshold Th1 (i.e., the first control signal is activated) and the amount of data stored in the HS-DSCH buffer 103 is less than the second threshold Th2 (i.e., the second control signal is activated), the mode determiner 417 determines initiation of turbo mode, and notifies a scheduler 421 and an HS-SCCH order generator 419 of such determination. The HS-SCCH order generator 419 creates an HS-SCCH order message whose UL turbo mode flag is set as shown in FIG. 7, and the HS-SCCH transmitter 105 sends the created HS-SCCH order message to the user equipment. The scheduler 421 adjusts scheduling of shared channels in relation to initiation of turbo mode of the user equipment.

During turbo mode of the user equipment, when the amount of data stored in the HS-DSCH buffer 103 exceeds the third threshold Th3 (i.e., the third control signal is activated), the mode determiner 417 determines transitioning from turbo mode to normal mode and notifies the scheduler 421 and the HS-SCCH order generator 419 of such determination. The HS-SCCH order generator 419 creates an HS-SCCH order message whose UL turbo mode flag is reset as shown in FIG. 7, and the HS-SCCH transmitter 105 sends the created HS-SCCH order message to the user equipment. The scheduler 421 adjusts scheduling of channels in relation to termination of turbo mode of the user equipment.

During turbo mode, when the amount of data stored in the HS-DSCH buffer 103 is less than or equal to the third threshold Th3, turbo mode may be sustained until all data stored in the E-DPCH buffer 205 is uploaded.

Figure 10:
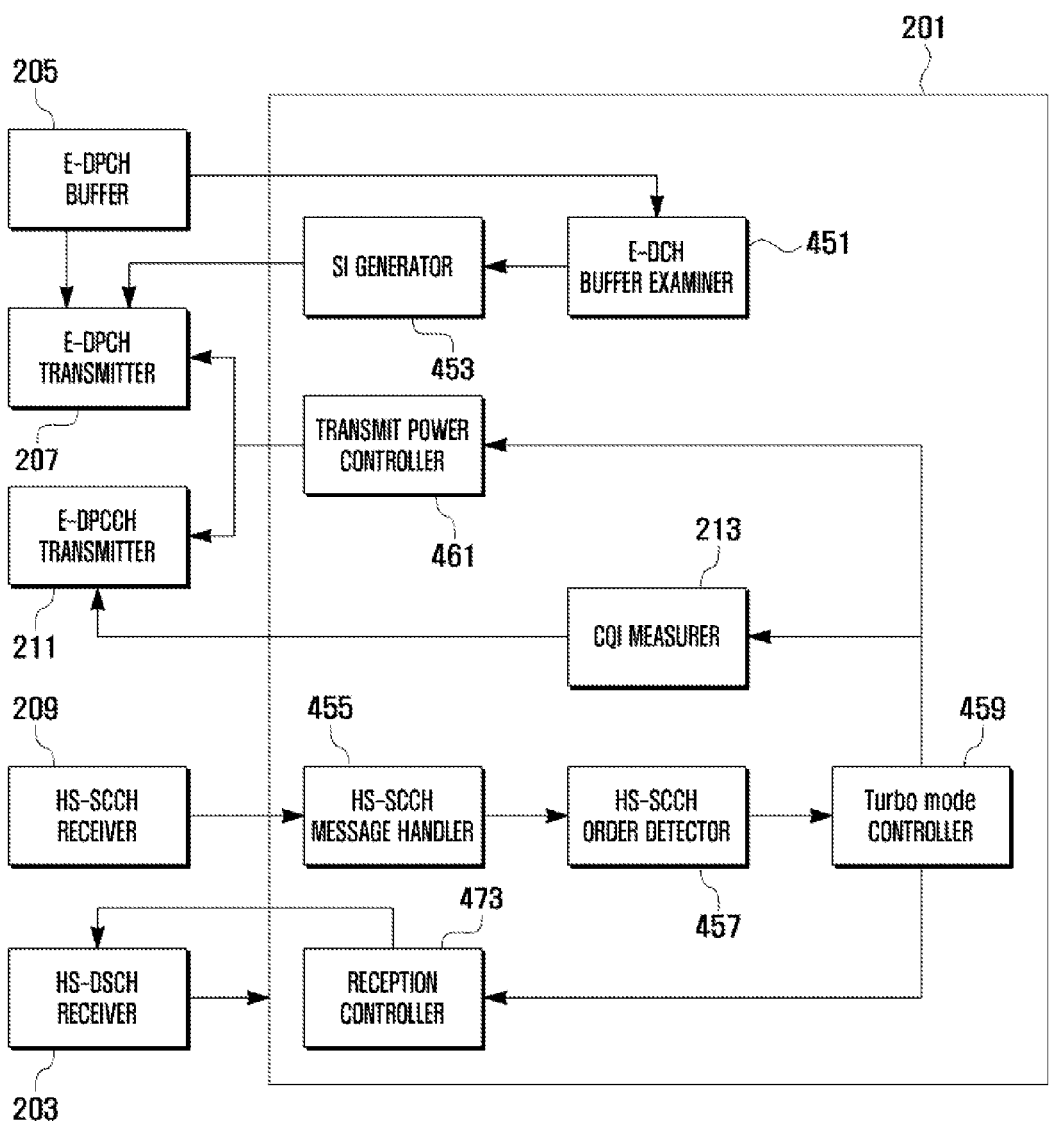
FIG. 10 is a block diagram illustrating a terminal apparatus performing turbo mode operation under the control of a base station according to an embodiment of the present invention.

FIG. 10 is a block diagram of a terminal apparatus performing turbo mode operation under the control of the base station according to an embodiment of the present invention.

Referring to FIG. 10, the CQI measurer 213 of the user equipment generates CQI information indicating channel quality in normal mode, and the HS-DPCCH transmitter 211 creates HS-DPCCH frame data containing CQI and HARQ information as shown in FIG. 6 and sends the same to the base station.

An E-DPCH buffer examiner 451 identifies the amount of data stored in the E-DPCH buffer 205 and forwards the identified amount of data to an SI generator 453. The SI generator 453 generates scheduling information indicating the amount of E-DPCH data. The E-DPCH transmitter 207 creates E-DPCH frame data containing the scheduling information and data stored in the E-DPCH buffer 205 and sends the E-DPCH frame data to the base station.

The HS-SCCH receiver 209 receives HS-SCCH frame data from the base station. An HS-SCCH message handler 455 processes HS-SCCH messages. And HS-SCCH order detector 457 selects an HS-SCCH order message from HS-SCCH messages, and extracts the turbo mode flag from the HS-SCCH order message as shown in FIG. 7 and forwards the turbo mode flag to a turbo mode controller 459. The turbo mode controller 459 controls the user equipment to transition between turbo mode and normal mode according to the value of the turbo mode flag.

When the turbo mode flag is set, the turbo mode controller 459 notifies the CQI measurer 213, a transmit power controller 461 and a reception controller 473. Then, the CQI measurer 213 suspends CQI measurement, and the reception controller 473 blocks reception operation of the HS-DSCH receiver 203. The transmit power controller 461 identifies transmit powers of channel transmitters other than the E-DPCH transmitter 207 and redirects available power to the transmit power of the E-DPCH transmitter 207 (possibly, an E-DPDCH transmitter). Here, the transmit power of the HS-DPCCH transmitter 211 may be redirected to the E-DPCH transmitter 207. The transmit power controller 461 calculates additional transmit power for the E-DPCH transmitter 207 using Equation 1, and adds the calculated power to the existing transmit power of the E-DPCH transmitter 207. Hence, the transmit power of the E-DPCH transmitter 207 is increased and the E-DPCH transmitter 207 uploads data stored in the E-DPCH buffer 205 to the base station at higher speed.

When the turbo mode flag is reset, the turbo mode controller 459 notifies the CQI measurer 213, the transmit power controller 461 and the reception controller 473. Then, the CQI measurer 213 resumes CQI measurement, and the reception controller 473 initiates reception operation of the HS-DSCH receiver 203. The transmit power controller 461 re-determines transmit powers of the E-DPCH transmitter 207 and other transmitters such as the HS-DPCCH transmitter 211. The transmit power controller 461 determines the transmit power of the HS-DPCCH transmitter 211 first, allocates transmit powers to all data transmitters except for the E-DPCH transmitter 207, and allocates the remaining power to the E-DPCH transmitter 207. Thereafter, the CQI measurer 213 creates CQI information and the HS-DPCCH transmitter 211 sends an HS-DPCCH message containing the CQI information to the base station. The HS-DSCH receiver 203 receives download data from the base station and the reception controller 473 processes the received download data.

Figure 11:
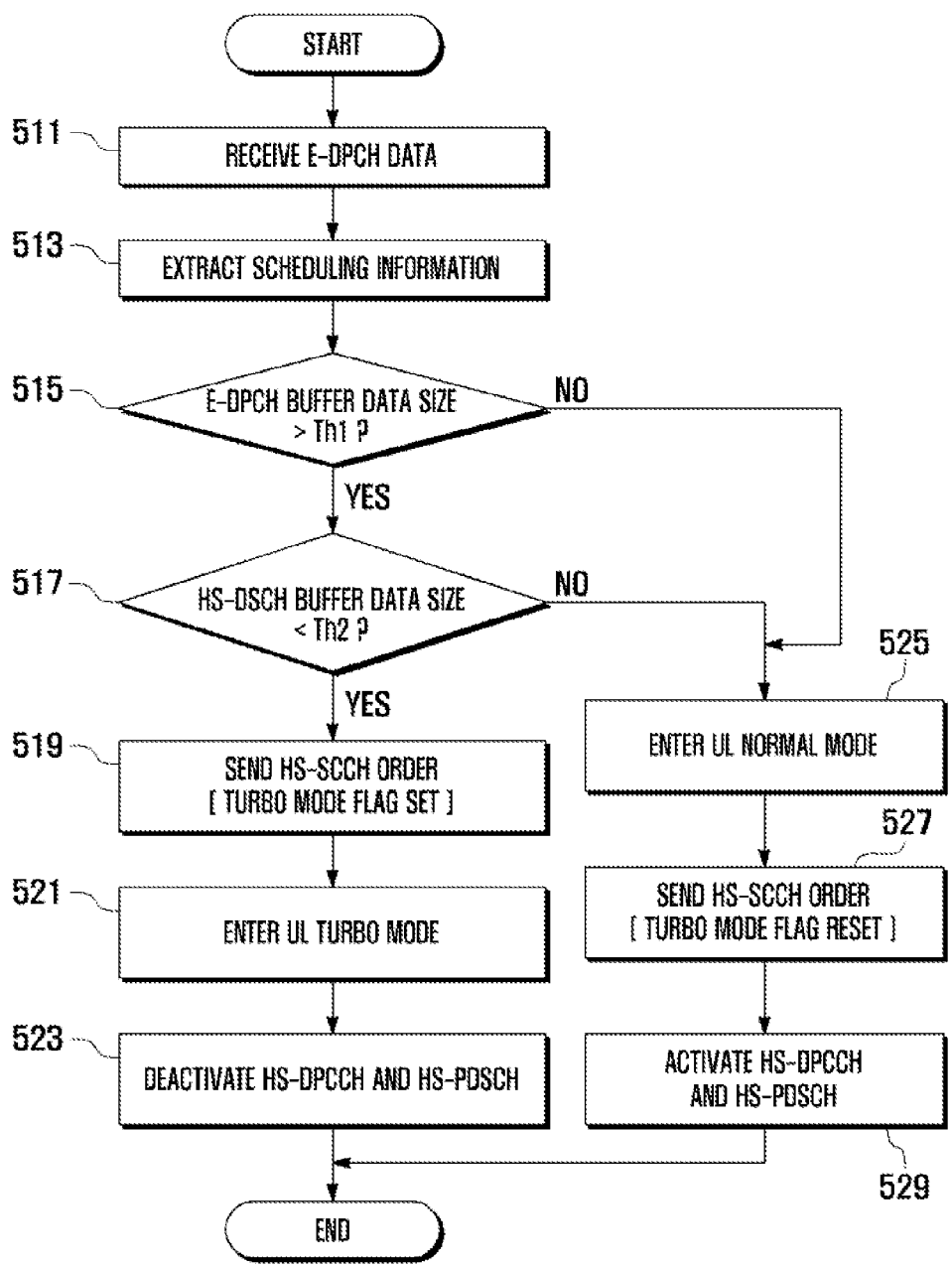
FIG. 11 is a flow chart illustrating a procedure performed by the base station equipment to control turbo mode operation of a user equipment.

FIG. 11 is a flow chart of a procedure performed by the base station equipment to control turbo mode operation of the user equipment.

Referring to FIG. 11, the control unit 101 of the base station receives E-DPCH data (511), extracts scheduling information (SI) from the received E-DPCH data (513) and identifies the amount of data stored in the E-DPCH buffer 205 using the scheduling information. The control unit 101 determines whether to initiate turbo mode of the user equipment by analyzing the amount of data stored in the E-DPCH buffer 205 and HS-DSCH buffer 103 (515 and 517). Whether to initiate turbo mode of the user equipment may be determined by a decision procedure described in Table 1.

TABLE 1

| Condition | Operation mode |
| --- | --- |
| E-DPCH data > Th1 and HS-DSCH < Th2 | Turbo mode |
| E-DPCH data < Th1 or HS-DSCH > Th3 | Normal mode |

When the turbo mode condition of Table 1 is satisfied, the control unit 101 sends an HS-SCCH order message whose turbo mode flag is set to the user equipment (519), and controls turbo mode operation of the user equipment (521 and 523). That is, the control unit 101 deactivates HS-DPCCH reception and HS-DSCH transmission related to the user equipment. Hence, the base station may receive E-DPCH data at higher speed from the user equipment in turbo mode, and may allocate HS-DSCH to another user equipment for efficient use of resources.

When the normal mode condition of Table 1 is satisfied at steps 515 and 517, the control unit 101 enters normal mode (525), sends an HS-SCCH order message whose turbo mode flag is reset (cleared) to the user equipment (527), and controls normal mode operation of the user equipment (529). That is, the control unit 101 activates HS-DPCCH reception and HS-DSCH transmission related to the user equipment. In Table 1, the normal mode condition is described as E-DPCH data<Th1 or HS-DSCH>Th3. However, when HS-DSCH>Th3 is not met in turbo mode, turbo mode may be sustained until all data stored in the E-DPCH buffer 205 is completely uploaded.

Figure 12:
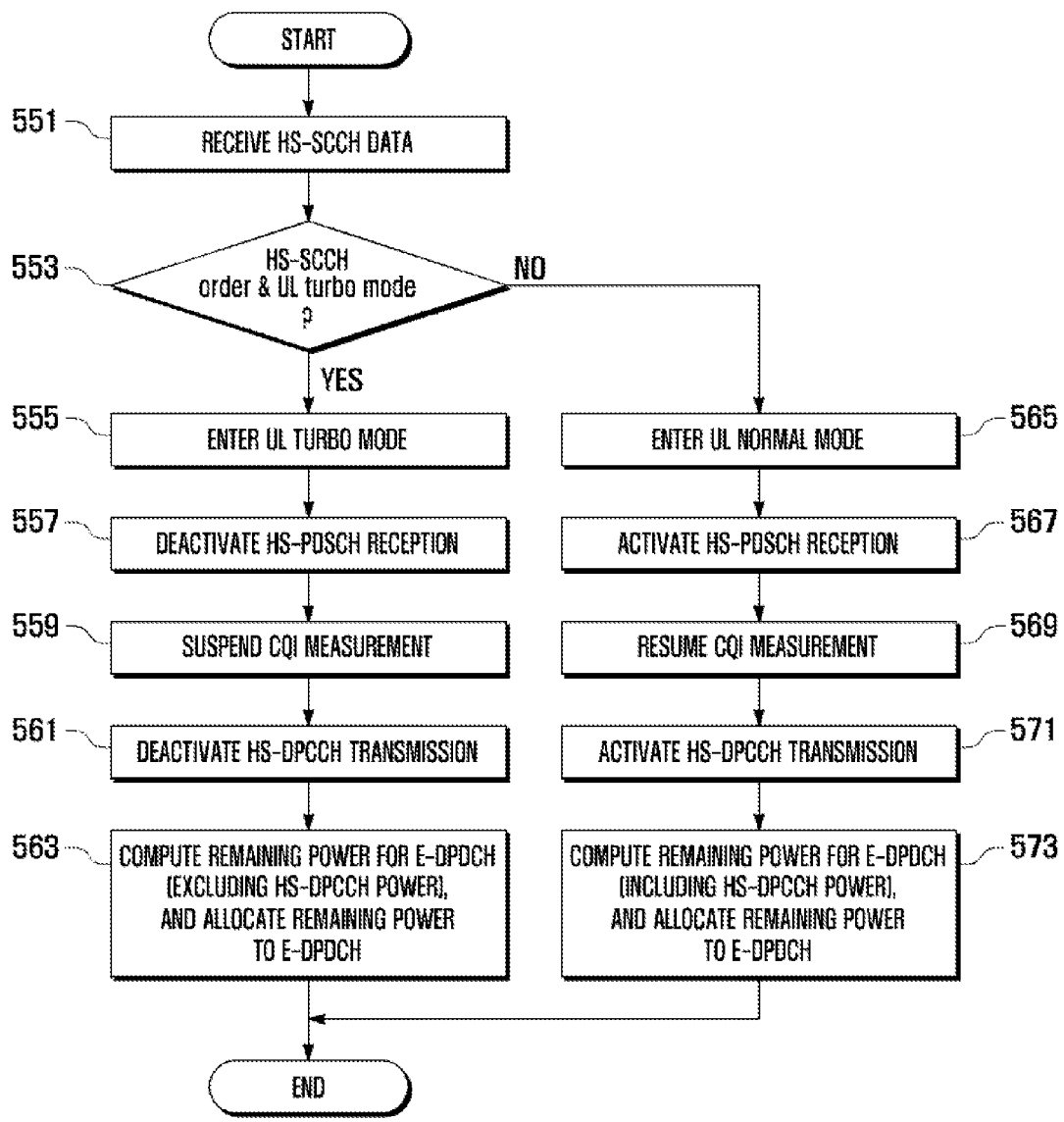
FIG. 12 is a flow chart illustrating a turbo mode procedure performed by a user equipment under the control of a base station.

FIG. 12 is a flow chart of a turbo mode procedure performed by the user equipment under the control of the base station.

Referring to FIG. 12, the control unit 201 of the user equipment receives HS-SCCH data (551), and checks the turbo mode flag of an HS-SCCH order message present in the received data to determine whether to initiate turbo mode (553).

When the turbo mode flag is set, the control unit 201 enters turbo mode and controls operations of the user equipment (555 to 563). In turbo mode, the user equipment suspends CQI generation, and deactivates HS-PDSCH reception and HS-DPCCH transmission. The control unit 201 computes the transmit power assigned to the HS-DPCCH transmitter using Equation 1, and redirects the computed power to the E-DPCH transmitter. Hence, in turbo mode, the user equipment may upload data at higher speed by increasing the transmit power of the E-DPCH transmitter.

When the turbo mode flag is reset, the control unit 201 enters normal mode and controls operations of the user equipment (565 to 573). In normal mode, the user equipment resumes CQI measurement, and activates HS-PDSCH reception and HS-DPCCH transmission. The control unit 201 allocates the remaining power, after allocating power to other data transmitters, to the E-DPCH transmitter. In normal mode, the user equipment may upload data with the transmit power of the E-DPCH transmitter set to the remaining power.

As described above, turbo mode operation is performed between a base station and a user equipment to thereby improve upload functionality of the user equipment. To be more specific, the user equipment in turbo mode may redirect power allocated to a particular data transmitter to E-DPDCH. When the user equipment utilizes the 16-QAM modulation scheme requiring high E-DPDCH transmit power, it may improve upload functionality by employing the method of the present invention. Second, the mobile terminal does not receive HS-DSCH data through HS-PDSCH after entering uplink turbo mode. Hence, the mobile terminal may reduce processing time required for HS-DSCH data. That is, as operation related to a downlink path of the user plane is not necessary, the mobile terminal may allocate more processing time to an uplink path. Third, when the user equipment enters uplink turbo mode, the base station does not have to allocate HS-PDSCH to the user equipment and may redirect the same to another user equipment. Hence, the base station may efficiently use channelization codes allocatable to HS-PDSCH. Fourth, the user equipment has to manage and identify necessity of transmission of ACK/NACK and CQI information in order to calculate the remaining power allocatable to E-DPDCH. After entering uplink turbo mode, the user equipment does not perform creation and transmission of ACK/NACK and CQI information, thereby simplifying control operation and transmit power calculation performed by the user equipment.

The invention claimed is:

1. A terminal apparatus in a high-speed packet access system, comprising:
    a dedicated control channel transmitter sending quality indicator information and acknowledgement information of the terminal apparatus;
    a packet data channel transmitter sending scheduling information having size information of a packet transmit buffer of the terminal apparatus and sending packet data of the terminal apparatus;
    a control data receiver receiving control data downloaded from a base station, wherein the control data includes an order message having a turbo mode flag; and
    a terminal control unit initiating, if the turbo mode flag is set, a turbo mode and redirecting, in the turbo mode for high-speed transmission, power allocated to the dedicated control channel transmitter to the transmit power of the packet data channel transmitter to provide additional power to the packet data channel transmitter.

2. The terminal apparatus of claim 1, further comprising:
    a packet data receiver receiving packet data downloaded from the base station,
    wherein, if the turbo mode flag is set, the terminal control unit deactivates the packet data receiver and the dedicated control channel transmitter in the turbo mode.

3. The terminal apparatus of claim 2, wherein the packet transmit buffer buffers data to be sent through the packet data channel transmitter, and wherein the terminal control unit sends the scheduling information having the size information of packet data stored in the packet transmit buffer through the packet data channel transmitter.

4. The terminal apparatus of claim 3, wherein the packet data channel transmitter corresponds to an enhanced dedicated data channel, the dedicated control channel transmitter corresponds to a high-speed dedicated control channel, the packet data receiver corresponds to a high-speed downlink shared channel, and the control data receiver corresponds to a high-speed shared control channel.

5. The terminal apparatus of claim 3, wherein, when the turbo mode flag is changed from set to reset, the terminal control unit activates the packet data receiver and the dedicated control channel transmitter and allocates remaining power, after transmit power is allocated to the dedicated control channel transmitter, to the packet data channel transmitter as transmit power.

6. A data transmission apparatus for a base station equipment in a high-speed packet access system, comprising:
    a packet data channel receiver receiving scheduling information having size information of a packet buffer in a user equipment and upload packet data;

a dedicated control channel receiver receiving quality indicator information and acknowledgement information from the user equipment;

a packet data transmitter sending packet data to be downloaded to the user equipment;

a control data transmitter sending control data to be downloaded to the user equipment wherein the control data includes a control order message having a turbo mode flag; and a control unit comparing amounts of data stored in the packet buffer of the user equipment and a packet buffer of the base station respectively with preset thresholds to determine the value of the turbo mode flag, and deactivating, when the turbo mode flag is set, the packet data transmitter and dedicated control channel receiver.

7. The data transmission apparatus of claim 6, wherein the control unit comprises:

a UE packet buffer examiner comparing the amount of data stored in the packet buffer, extracted from scheduling information from the user equipment, with a first threshold;

a BS packet buffer examiner comparing the amount of data stored in the packet buffer in the base station with a second threshold;

a mode determiner determining turbo mode when the UE packet buffer examiner determines that the amount of data of the user equipment is greater than the first threshold and the BS packet buffer examiner determines that the amount of data of the base station is less than the second threshold; and a control order generator generating, when turbo mode is determined, a control order message whose turbo mode flag is set and forwarding the control order message to the control data transmitter.

8. The data transmission apparatus of claim 7, wherein the BS packet buffer examiner further has a third threshold, and wherein, when the BS packet buffer examiner determines that the amount of data of the packet buffer in the base station is greater than the third threshold, the control order generator generates a control order message whose turbo mode flag is reset.

9. A data transmission method for a user equipment in a high-speed packet access system, comprising:

sending packet data containing scheduling information having size information of a packet buffer through an uplink channel, and sending quality indicator information and acknowledgement information of the user equipment through another uplink channel;

checking a turbo mode flag of an order message contained in control data received from the base station; and deactivating, when the turbo mode flag is set, packet data reception and control data transmission, and redirecting transmit power of a specified transmitter to a packet data transmitter to increase transmit power of the packet data transmitter for faster packet data upload.

10. The data transmission method of claim 9, further comprising: activating, when the turbo mode flag is reset, packet data reception and control data transmission, and allocating remaining power, after transmit power is allocated to the specified transmitter, to the packet data transmitter as transmit power for packet data upload.

11. A data transmission method for a base station equipment in a high-speed packet access system, comprising:

receiving scheduling information containing size information of a packet buffer in a user equipment and upload packet data;

determining the value of the turbo mode flag by comparing amounts of data stored in the packet buffer of the user equipment and a packet buffer of a base station respectively with preset thresholds; and deactivating, when the turbo mode flag is set, operation of a packet data transmitter and a dedicated control channel receiver, and processing packet data uploaded at high speed from the user equipment.

12. The data transmission method of claim 11, wherein determining the value of the turbo mode flag comprises initiating turbo mode by setting the turbo mode flag when the amount of data stored in the packet buffer in the user equipment is greater than a first threshold and the data size of the packet buffer in the base station is less than a second threshold.

13. The data transmission method of claim 12, wherein determining the value of the turbo mode flag further comprises terminating, when the amount of data stored in the packet buffer in the base station is greater than a third threshold, turbo mode, notifying the user equipment of turbo mode termination, and activating operation of the packet data transmitter and dedicated control channel receiver.

* * * * *